US008658331B2

(12) United States Patent
Fly et al.

(10) Patent No.: US 8,658,331 B2
(45) Date of Patent: *Feb. 25, 2014

(54) STRUCTURAL REINFORCEMENT OF MEMBRANE ELECTRODES

(75) Inventors: Gerald W. Fly, Geneseo, NY (US);
Yeh-Hung Lai, Webster, NY (US);
Chunxin Ji, Pennfield, NY (US);
Jeanette E. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/912,838

(22) Filed: Oct. 27, 2010

(65) Prior Publication Data

US 2011/0039192 A1    Feb. 17, 2011

Related U.S. Application Data

(63) Continuation of application No. 12/170,706, filed on Jul. 10, 2008, now Pat. No. 7,858,266.

(51) Int. Cl.
*H01M 4/02* (2006.01)
*H01M 8/02* (2006.01)
*B01J 23/00* (2006.01)

(52) U.S. Cl.
USPC .......................... 429/530; 429/523; 502/300

(58) Field of Classification Search
USPC .......... 429/494, 481, 483, 530, 523; 427/115; 156/306.3; 521/27; 502/101, 180, 339, 502/325, 159, 182, 300; 204/290.14, 252
See application file for complete search history.

(56) References Cited

U.S. PATENT DOCUMENTS

| | | |
|---|---|---|
| 6,156,449 A | 12/2000 | Zuber et al. |
| 6,159,895 A | 12/2000 | Koch et al. |

| | | | |
|---|---|---|---|
| 2003/0091891 A1 | 5/2003 | Yoshida et al. | |
| 2004/0045816 A1* | 3/2004 | Masel et al. | 204/290.14 |
| 2004/0062970 A1* | 4/2004 | Nomura et al. | 429/33 |
| 2004/0197638 A1* | 10/2004 | McElrath et al. | 429/44 |
| 2004/0258979 A1* | 12/2004 | Ye et al. | 429/44 |
| 2005/0074651 A1 | 4/2005 | Kidai et al. | |

(Continued)

FOREIGN PATENT DOCUMENTS

| | | | |
|---|---|---|---|
| CN | 101071874 A | 11/2007 | |
| WO | WO-2007/115898 A1 * | 10/2007 | H01M 4/92 |

OTHER PUBLICATIONS

"Transparent conducting film: Effect of vacuum filtration of carbon nanotube suspended in oleum", Saotome et al., Bull. Mater. Sci. vol. 34, No. 4, Jul. 2011, pp. 623-628.*
Machine Translation of: WO 2007/115898 A1, Braeuninger et al., Oct. 18, 2007.*
"The characterization of high-performance PAN-based carbon fibers developed by continuous carbonization and air oxidation", Ko et al., J of Materials Research, vol. 10, No. 6, Jun. 1995, 1529.
"Vapor Grown Carbon Fiber production Information", Showa Denko Group, 13-9, Shiba Daimon 1-chrome, Minato-ku, Tokyo 105-8518, 2006. Website: http://www.sdk.co.jp/html/english/products/finecarbon/vgcf.html.
"PAN Pulp Fiber", Chaangzhou Yoben Friction Materials Co., Changzhou, Jianngsu, China (Mainland). www.ybgfzcl.cn, retrieved on Dec. 23, 2009.
"PP and PAN Acrylic Fiber", AHA International Co., retrieved online on Aug. 9, 2010 from: http://ahaint.en.alibaba.com/product/247428482-50019275/PP_and_Pan_Acrylic_Fibre.html.

*Primary Examiner* — Kenneth Douyette
(74) *Attorney, Agent, or Firm* — Fraser Clemens Martin & Miller LLC; J. Douglas Miller

(57) ABSTRACT

A catalyst ink composition for a fuel cell electrode is provided. The catalyst ink composition includes a plurality of electrically conductive support particles; a catalyst formed from a finely divided precious metal, the catalyst supported by the conductive support particles; an ionomer; at least one solvent; and a reinforcing material configured to bridge and distribute stresses across the electrically conductive support particles of the ink composition upon a drying thereof. An electrode for a fuel cell and a method of fabricating the electrode with the catalyst ink composition are also provided.

20 Claims, 3 Drawing Sheets

(56) References Cited

U.S. PATENT DOCUMENTS

| | | | |
|---|---|---|---|
| 2005/0238948 A1* | 10/2005 | Mei et al. ................. 429/40 | |
| 2006/0002844 A1 | 1/2006 | Suenaga et al. | |
| 2006/0102869 A1* | 5/2006 | Cavaille et al. ............ 252/62.2 |
| 2008/0008925 A1 | 1/2008 | Deng et al. | |
| 2008/0115875 A1 | 5/2008 | Jeng et al. | |

\* cited by examiner

STRUCTURAL REINFORCEMENT OF MEMBRANE ELECTRODES

CROSS-REFERENCE TO RELATED APPLICATIONS

This application is a continuation of U.S. patent application Ser. No. 12/170,706 filed on Jul. 10, 2008, now U.S. Pat. No. 7,858,266. The entire disclosure of the above application is hereby incorporated herein by reference.

FIELD OF THE INVENTION

The present disclosure relates to electrodes for a fuel cell and, more particularly, to catalyst inks for fabrication of the electrodes for the fuel cell.

BACKGROUND OF THE INVENTION

A fuel cell has been proposed as a clean, efficient and environmentally responsible power source for electric vehicles and various other applications. Individual fuel cells can be stacked together in series to form a fuel cell stack. The fuel cell stack is capable of supplying a plurality of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: a pair of electrodes, including a cathode and an anode; and an electrolyte membrane. The electrolyte membrane is sandwiched between the electrodes to form a membrane-electrode-assembly (MEA). The MEA is typically disposed between porous diffusion media, such as carbon fiber paper, which facilitates a delivery of reactants such as hydrogen to the anode and oxygen to the cathode. In the electrochemical reaction of the fuel cell, the hydrogen is catalytically oxidized in the anode to generate free protons and electrons. The protons pass through the electrolyte to the cathode. The electrons from the anode cannot pass through the electrolyte membrane, and are instead directed to the cathode through an electrical load, such as an electric motor. The protons react with the oxygen and the electrons in the cathode to generate water.

The electrodes of the fuel cell are generally formed from a finely divided catalyst. The catalyst may be any of electrocatalyst which catalytically supports at least one of an oxidation of hydrogen and a reduction of oxygen for the fuel cell electrochemical reaction. The catalyst typically is a precious metal, such as platinum or another platinum-group metal. The catalyst is disposed on a carbon support such as carbon black particles, and is typically dispersed in a proton-conducting polymer, also known as an ionomer. A typical ionomer is a perfluorosulfonic acid (PFSA) polymer, although other ionomer material, including hydrocarbon ionomers such as sulfonated polyetherketones, aryl ketones, and polybenizimidazoles may also be used. One type of perfluorosulfonic acid (PFSA) polymer is commercially available as Nafion® from the E. I. du Pont de Nemours and Company. The electrolyte membrane is likewise formed from an ionomer, typically in the form of a layer.

One known method of forming the electrodes of the fuel cell includes applying a catalyst ink to a suitable fuel cell substrate. An example of a catalyst ink and methods of application is described in U.S. Pat. No. 6,156,449 to Zuber et al., the disclosure of which is hereby incorporated herein by reference in its entirety. The catalyst ink typically contains the catalyst on the carbon support, the ionomer, and a solvent. The catalyst ink is subsequently dried to drive off the solvent and form the electrode. Typical substrates include the electrolyte membrane, such as in a catalyst coated membrane or CCM design, and the diffusion media such as in a catalyst coated diffusion media or CCDM design. Additional known substrates may include polymeric substrates, such as PTFE, ePTFE, and ETFE, for example, which can be laminated to the electrolyte membrane in a decal transfer process.

The typical catalyst ink-fabricated electrode is known to have a network of cracks formed in the surface thereof. The network of cracks is also known as the phenomenon of "mud-cracking". The cracks may form due to non-uniform drying of the catalyst ink during fabrication of the electrodes. The cracks may also form following drying due to an inherent weakness of the electrode. The electrode is formed from a porous matrix of the carbon support bound by the ionomer. The ionomer is a relatively weak binder and the matrix of the carbon support within the ionomer may not be continuous. The carbon support also provides minimal reinforcement to the ionomer, such that the resulting matrix may not withstand substantial stresses during and after the drying of the catalyst ink, resulting in a greater opportunity for the cracks to form during operation of the fuel cell.

The network of cracks can undesirably impact the performance of the fuel cell in a variety of ways. For example, during the typical expansion and contraction of the electrolyte membrane during fuel cell operation, the base of the cracks can form a stress concentration on the adjacent electrolyte membrane which may result in degradation thereof, such as pin-hole formation. The electrolyte membrane immediately adjacent the crack is also exposed to a different humidity environment than the electrolyte membrane immediately adjacent the electrode. The expansion of the electrolyte membrane into the cracks can also degrade the electrolyte membrane, particularly after repeated expansion and contraction cycles. The network of cracks in the electrode can also reduce the effective stiffness of the electrode, resulting in an undesirable movement of the MEA during fuel cell operation.

It is known to minimize the formation of the network of cracks by increasing a time allowed for the catalyst ink to dry. However, increasing the drying time also increases manufacturing costs. Increasing the drying time also does not optimize a resistance to cracking of the electrode during subsequent operation of the fuel cell.

There is a continuing need for a catalyst ink composition for a fuel cell that militates against the formation of a network of cracks in the electrode. Desirably, the catalyst ink composition reduces the occurrence of stress concentrations of the electrolyte membrane, optimizes a durability of the electrode, and provides external reinforcement to the electrolyte membrane.

SUMMARY OF THE INVENTION

In concordance with the instant disclosure, a catalyst ink composition that militates against the formation of a network of cracks in the electrode, reduces the occurrence of stress concentrations of the electrolyte membrane, optimizes a durability of the electrode, and provides external reinforcement to the electrolyte membrane, is surprisingly discovered.

In a first embodiment, a catalyst ink composition for a fuel cell electrode includes a plurality of electrically conductive support particles; a catalyst formed from a finely divided precious metal, the catalyst supported by the conductive support particles; an ionomer; at least one solvent; and a reinforcing material. The reinforcing material is configured to bridge and distribute stresses across the electrically conductive support particles of the ink composition upon a drying thereof.

In another embodiment, an electrode for a fuel cell includes an ionomer matrix having a plurality of electrically conductive support particles supporting a catalyst formed from a finely divided precious metal. The electrode includes a reinforcing material. The reinforcing material is substantially evenly distributed throughout the ionomer matrix. The reinforcing material bridges across the electrically conductive support particles and is configured to distribute stresses on the electrode.

In a further embodiment, a method for fabricating an electrode for a fuel cell, includes the steps of: providing a substrate for the electrode; providing a catalyst ink comprising a plurality of electrically conductive support particles, a catalyst formed from a finely divided precious metal, the catalyst supported by the conductive support particles, an ionomer, at least one solvent, and a reinforcing material configured to bridge and distribute stresses across the electrically conductive support particles of the ink composition upon a drying thereof; depositing the catalyst ink onto the substrate; and drying the catalyst ink to form the electrode for the fuel cell.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1:
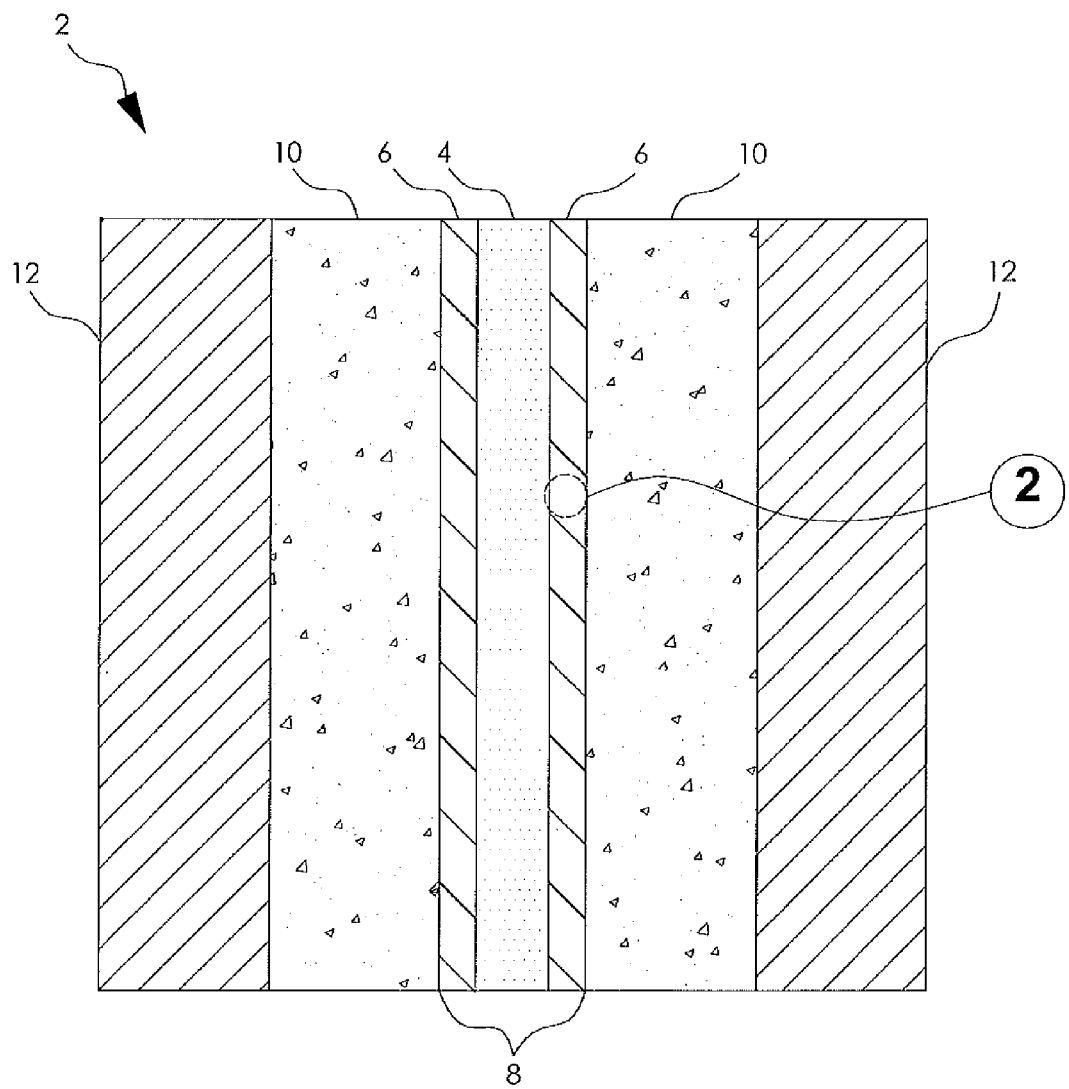
FIG. 1 is a schematic cross-sectional view of a fuel cell having electrodes formed from the catalyst composition of the present disclosure.

As shown in FIG. 1, an illustrative fuel cell 2 includes an electrolyte membrane 4 disposed between a pair of electrodes 6. The electrodes 6 form a cathode and an anode of the fuel cell 2 for use in the fuel cell electrochemical reaction as described hereinabove. The electrodes 6 may be deposited onto the electrolyte membrane 4, such as in a CCM design, for example, to form a membrane electrode assembly (MEA) 8. Each of the electrodes 6 may have a gas diffusion layer 10 disposed adjacent thereto. The electrodes 6 may be deposited onto the gas diffusion layers 10, such as in a CCDM design, for example. The electrolyte membrane 4, the electrodes 6, and the gas diffusion layers 10 are typically further disposed between a pair of fuel cell plates 12. The fuel cell plates 12 may be unipolar or bipolar plates, for example, as are known in the art. In one embodiment, the fuel cell plates 12 are substantially as described in Assignee's co-pending U.S. application Ser. No. 11/696,361, hereby incorporated herein by reference in its entirety. Other electrolyte membrane 4, diffusion media 10, and fuel cell plate 12 designs and configurations may be employed with the electrodes 6 of the present disclosure, as desired.

Figure 2:
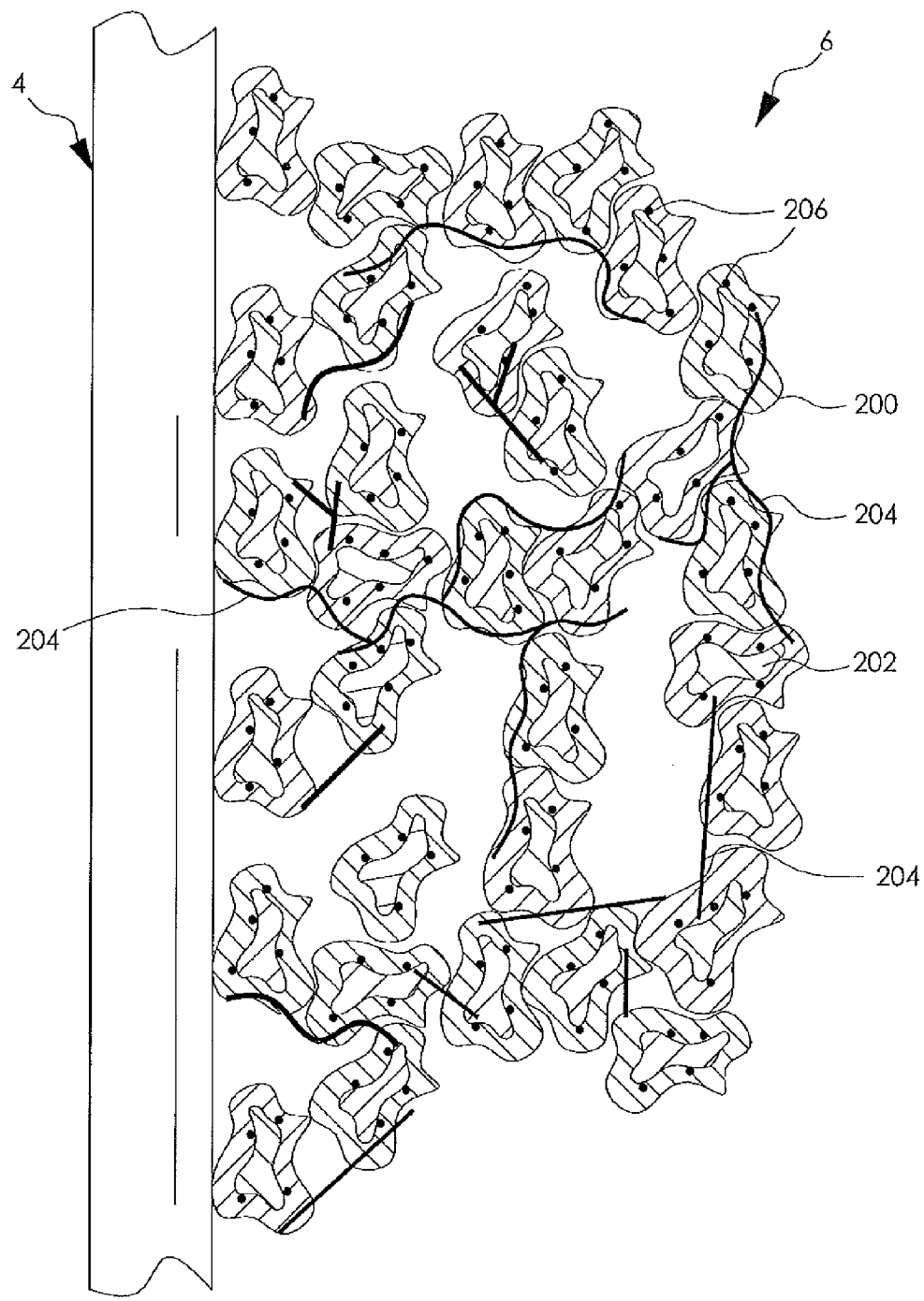
FIG. 2 is an enlarged view of one of the electrodes of the fuel cell depicted in FIG. 1, showing a variety of reinforcement materials bridging conductive support particles of the electrode.
Figure 3:
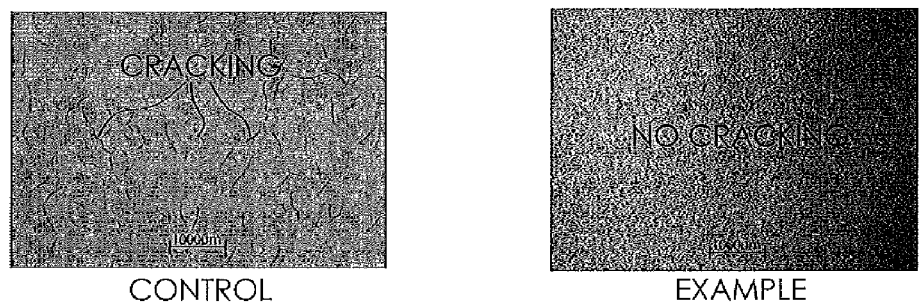
FIG. 3 shows a pair of micrographs illustrating the absence of cracking in the surface of electrodes fabricated according to the present disclosure.

A particular structure of the electrode 6 of the present disclosure is shown in FIG. 2. The electrode 6 includes a matrix of an ionomer 200 having a plurality of electrically conductive support particles 202 and a reinforcing material 204 substantially evenly distributed therethrough. The porous layer or matrix of the ionomer 200 is formed from any suitable proton-conducting polymer that is substantially stable under the operating conditions and temperatures associated with operation of the fuel cell 2. In particular embodiments, the ionomer 200 is a polymer having sulfonic acid groups, such as perfluorosulfonic acid (PFSA) polymer. One of ordinary skill in the art may select other proton-conducting polymers, as desired.

The conductive support particles 202 support a catalyst 206. In a particularly illustrative embodiment, the catalyst 206 is disposed substantially exclusively on the conductive support particles 202, as opposed to the ionomer and the reinforcing material 204 of the electrode 6. A skilled artisan should understand that the conductive support particles 202 may be formed from any material having sufficiently high electrical conductivity and surface area for use in the fuel cell 2. As nonlimiting examples, the conductive support particles 202 may be formed from a carbonaceous material, such as at least one of carbon black, graphite, and activated carbon. Other suitable conductive materials may also be employed, as desired.

The catalyst 206 is formed from a finely divided precious metal having a catalytic activity. For example, the catalyst 206 may be formed from platinum of one of the platinum group metals including palladium, iridium, rhodium, ruthenium, and alloys thereof. Suitable alloys based on platinum and another metal such as ruthenium, for example, may be employed. The catalyst 206 may include other alloying additions such as cobalt, chromium, tungsten, molybdenum, vanadium, iron, copper, and nickel, for example. One of ordinary skill in the art should understand that admixtures of the conductive support particles 202 with the catalyst 206 supported thereby may be commercially available, for example, from manufacturers such as the Tanaka Kikinzoku Group, Umicore Group, and Johnson Matthey. In particular embodiments where the catalyst 206 is formed from platinum and the conductive support particle 202 from carbon, the catalyst 206 on the conductive support particle 202 may be provided in a ratio ranging from about twenty (20) weight percent Pt/C to about seventy (70) weight percent Pt/C. Other suitable weight percent ratios of the catalyst 206 to the conductive support particles 202 may be selected, as desired.

It should be appreciated that the reinforcing material 204 bridges across the electrically conductive support particles 202 of the electrode 6. The reinforcing material 204 is thusly configured to distribute stresses on the electrode 6, for example. In particular, the reinforcing material 204 militates against a formation of a network of cracks normally associated with electrodes 6 produced from catalyst inks. The reinforcing material 204 has a size sufficient for the reinforcing material 204 to bridge individual conductive support particles 202. For example, the reinforcing material may have BET surface area between about 10 $m^2/g$ and 300 $m^2/g$, and particular between about 10 $m^2/g$ and about 100 $m^2/g$, although it should be appreciated that reinforcing materials 204 with other suitable surface area values may also be selected.

The reinforcing material 204 is formed from a material that is substantially stable under conditions and temperatures typically associated with operation of the fuel cell 2. The reinforcing material 204 is generally electrically conductive, although it should be appreciated that electrically nonconductive reinforcing materials 204 may also be employed as long as the electrode 6 itself remains substantially electrically conductive. In a particular embodiment, the reinforcing material 204 is a fiber. The fiber may be a substantially straight fiber, a branched fiber, or a fibrillated fiber, for example. In one example, the reinforcing material 204 is provided in the form of a highly fibrillated polymeric pulp, such as Kevlar® aramid pulps and acrylic pulps as are known in the art.

As nonlimiting examples, the reinforcing material 204 may include at least one of a carbon nanofiber, a carbon nanotube, a glass nanofiber, a polymeric nanofiber, and a metal oxide nanofiber. It should be appreciated that the carbon nanofibers are generally smaller is diameter than conventional continuous or milled carbon fibers (e.g., about 5 microns to about 10 microns) but larger in diameter than carbon nanotubes (e.g., about 1 nanometer to about 10 nanometers). A typical carbon nanofiber may include Pyrograf® III carbon nanofibers produced by Applied Sciences Inc. in Cedarville, Ohio, and vapor-grown carbon fibers (VGCF) available from Showa Denko Carbon, Inc. in Ridgeville, S.C. Suitable polymeric nanofibers may include polyethylene terephthalate (PET) or polyethylene naphthalate (PEN) nanofibers. The polymeric nanofibers may be carbonized, for example, to form the carbon nanofibers for use as the reinforcing material 204. Other suitable fibrous materials may also be selected, as desired.

The reinforcing material 204 may have a diameter from about 50 nm to about 150 nm, in particular from about 75 nm to about 125 nm, and in most particular about 100 nm. The reinforcing material 204 has a length sufficient for the reinforcing material 204 to bridge between at least two of the conductive support particles 202 dispersed throughout the ionomer 200 of the electrode 6. As nonlimiting examples, the length of the reinforcing material 204 may range from about 20 μm to about 300 μm, and particularly from about 50 μm to about 100 μm. Suitable diameters and lengths of the fiber forming the reinforcing material 204 may be selected as desired.

In a further embodiment, the reinforcing material 204 may have a surface modified to increase at least one of a physical entanglement and a chemical adhesion of the reinforcing material 204 with the conductive support particles 202. As a nonlimiting example, the reinforcing material 204 may be treated with an organosilane, such as hexamethyl disiloxane (HMDSO), tetra ethoxy silane (TEOS), hexamethyl disilazane (HMDSN), or like organosilane coatings. The reinforcing material 204 may further be treated to form one or more functional groups on the surface thereof, such as hydroxyl groups, carboxyl groups, aldehyde groups, amide groups, and amine groups, for example, to increase the interaction of the reinforcing material 204 with the conductive support particles 202. Suitable functional groups may be selected as desired.

The reinforcing material 204 has a modulus that is greater than a modulus of the electrode 6 without the reinforcing material 204 present. In particular embodiments where the reinforcing material 204 is fibrous, for example, the modulus may be a tensile Young's modulus of individual fibers, for example. In other embodiments where the reinforcing material 204 is the fibrillated pulp, it should be appreciated that the modulus may be the tensile Young's modulus of individual fibers within the pulp, and not the bulk fibrillated pulp itself.

The modulus of the reinforcing material 204 is preferably at least one order of magnitude greater than the modulus of the electrode without the reinforcing material 204 present. In particular embodiments, the reinforcing material 204 has a modulus greater than about 300 Mpa, in certain embodiments greater than about 500 Mpa, and in most particular embodiments greater than about 700 Mpa. A skilled artisan may select other suitable reinforcing material 204 physical properties as desired.

It should be appreciated that the electrodes 6 according to the present disclosure are fabricated from a catalyst ink. The catalyst ink includes the ionomer 200, the conductive support particles 202 supporting the catalyst 206, the reinforcing material 204, and at least one solvent. The solvent typically includes at least one of an organic solvent and an aqueous solvent. Suitable solvents for solvating the ionomer 200 may include water, mono- and polyhydric alcohols, glycols, and glycol ether alcohols, and glycol ethers. The ionomer 200 may be provided pre-solvated, for example, as part of an aqueous solution containing water and an alcohol. A particularly useful solvent for the catalyst 206 is ethanol, for example, which may be employed to optimize the dispersion thereof in the catalyst ink One of ordinary skill in the art should also understand that less polar solvents, such as a longer chain alcohol, for example, propanol, butanol, pentanol, and hexanol, may also be particularly advantageous in providing a desirable level of dispersion of the reinforcing material 204 in the catalyst ink.

One of ordinary skill in the art may select the particular relative weight ratios of the ionomer 200, the conductive support particles 202, the reinforcing material 204, the catalyst 206, and the at least one solvent, as desired. The weight ratio of the ionomer 200 to the conductive support particles 202 in the catalyst ink is typically between about 0.6:1 and about 2:1, and in particular between about 0.9:1 and about 2:1. In certain embodiments, the weight ratio of the conductive support particles 202 to the reinforcing material 204 is from about 15:1 to about 1:5. In a particularly illustrative embodiment, the weight ratio of the conductive support particles 202 to the reinforcing material 204 is about 3:1.

To produce a desirably homogeneous catalyst ink dispersion, the abovementioned ingredients may be admixed and ball milled with a milling media, such as ceramic beads having sufficiently high density as known in the art. Suitable ceramic beads may include yttria-stabilized zirconia beads, for example. The beads may have an average diameter from about 3 mm to about 5 mm, for example. The catalyst ink may be mixed for up to about 72 hours, for example, or until the conductive support particles 202 and the reinforcing material 204 is sufficiently deagglomerated and dispersed within the catalyst ink. Other known auxiliaries may also be used such as, for example, high-speed stirrers, ultrasound baths, or three-roll mills.

The present disclosure further includes a method of fabricating the electrode 6 using the catalyst ink. The method includes the steps of providing a substrate for the electrode 6, and providing the catalyst ink with a plurality of electrically conductive support particles 202, the catalyst 206 formed from the finely divided precious meta and supported by the conductive support particles 202, the ionomer 200, the at least one solvent, and the reinforcing material 204. The substrate is generally at least one of the electrolyte membrane 4 and the gas diffusion layer 10. Other suitable substrates may be selected as desired.

The catalyst ink is then deposited onto the substrate. The step of depositing the catalyst ink onto the substrate may include at least one of spraying, dipping, brushing, roller transfer, slot die coating, gravure coating, Meyer rod coating, and printing the catalyst ink onto the substrate. The step of depositing the catalyst ink onto the substrate may also include a decal transfer process of laminating a polymeric substrate, such as one of PTFE, ePTFE, and ETFE, to the electrolyte membrane 4. The catalyst ink is deposited at a thickness sufficient for the electrode 6, following a drying of the catalyst ink, to have a thickness optimized for catalyst 206 loading and electrocatalytic activities. In particular, the thickness of the electrode 6 produced from the deposited catalyst ink may be between about 1 micron and about 100 micron, and most particularly between about 5 micron and about 50 micron.

Following the deposition of the catalyst ink onto the substrate, the catalyst ink is dried to form the electrode 6. The drying of the catalyst ink to form the electrode 6 is generally conducted at an elevated temperature selected to drive off the at least one solvent without thermally degrading the ionomer 200, the conductive support particles 202, the reinforcing material 204, and the catalyst 206. In a particular embodiment, the step of drying the catalyst ink includes drying the catalyst ink with an infrared drier. As a nonlimiting example, the catalyst ink may be dried at a temperature of about 400° F. for up to about 4 minutes. Other suitable drying temperatures and times may also be employed. It should be appreciated that with the catalyst ink of the present disclosure, however, the drying time may be optimized while militating against the formation of the network of cracks in the electrode 6.

EXAMPLES

The following examples are merely illustrative and do not in any way limit the scope of the disclosure as described and claimed.

A first catalyst ink formulation according to the present disclosure was prepared by mixing the ingredients shown in Table 1 below. The ingredients were added simultaneously and ball milled with a ceramic milling media for about 72 hours.

TABLE 1

| CATALYST INK COMPOSITION | WT % |
|---|---|
| Support particles/Catalyst (50 wt % Pt/Vulcan carbon black) | 9.9 |
| Ionomer | 26.2 |
| Water | 24.9 |
| Ethanol | 37.5 |
| Nanofiber (Pyrograf III PR24XTHHT) | 1.5 |
| TOTAL | 100.0 |

A first control MEA and a first example MEA were prepared. The first control MEA included an electrode containing Pt/Vulcan. The first example MEA included an electrode prepared according to the present disclosure with the catalyst ink formulation shown in Table 1, containing carbon nanofiber (Pyrograf III PR24XTHHT) at a weight ratio of about 3:1 carbon to nanofiber. The first example MEA was prepared by depositing the catalyst ink onto an electrolyte membrane as described hereinabove. In both MEAs, the electrolyte membranes were about 25 μm Nafion® NRE211.

The surface of the first example MEA was analyzed by scanning electron microscope (SEM) to a scale of about 1000 μm. Cracking was observed on the surface of the first control MEA fabricated with a conventional catalyst ink. No cracking was observed on the surface of the first example MEA having the nanofiber reinforcing material.

A second catalyst ink formulation according to the present disclosure was prepared by mixing the ingredients shown in Table 2 below. The ingredients were added simultaneously and ball milled with a ceramic milling media for about 72 hours.

TABLE 2

| CATALYST INK COMPOSITION | WT % |
|---|---|
| Support particles/Catalyst (50 wt % Pt/Vulcan carbon black) | 8.0 |
| Ionomer | 3.0 |
| Water | 34.0 |
| Ethanol | 34.0 |
| Isopropanol alcohol | 17.0 |
| Nanofiber (Pyrograf III PR24XTHHT) | 4.0 |
| TOTAL | 100.0 |

A second control MEA and a second example MEA were prepared. The second control MEA included an electrode containing Pt/Vulcan. The second example MEA included an electrode prepared according to the present disclosure with the catalyst ink formulation shown in Table 2, containing carbon nanofiber (Pyrograf III PR24XTHHT) at a weight ratio of about 1:1 carbon to nanofiber. The second example MEA was prepared by depositing the catalyst ink onto an electrolyte membrane as described hereinabove. In both MEAs, the electrolyte membranes were about 25 μm Nafion® NRE211.

Figure 4:
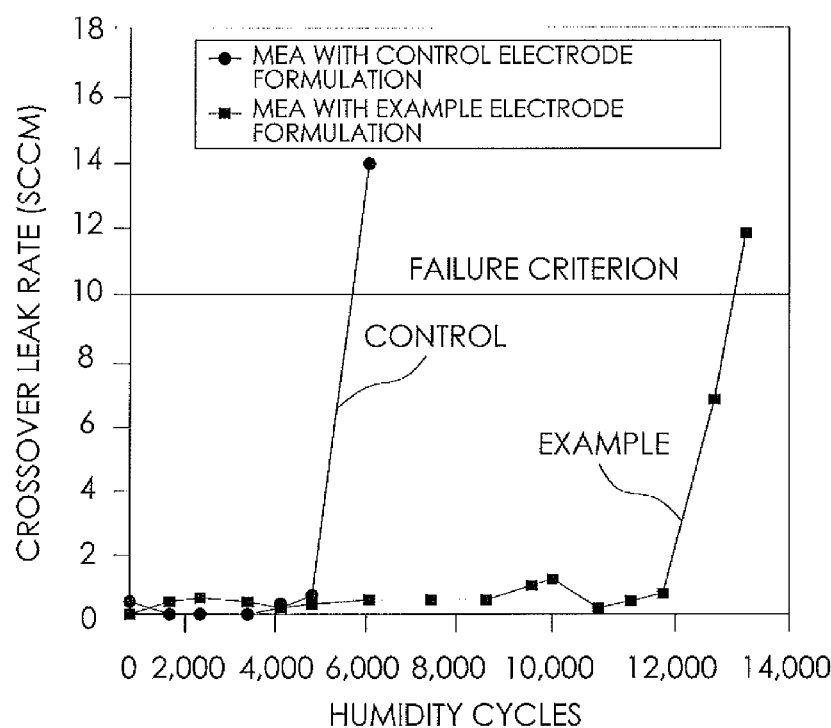
FIG. 4 is a chart illustrating the mechanical durability of a membrane electrode assembly according to the present disclosure relative to a state of the art membrane electrode assembly.

With reference to FIG. 4, an in-situ humidity cycling test was utilized to evaluate the mechanical durability benefit of a fuel cell using the second example MEA. The second control and example MEAs were subjected to repeat cycling between wet and dry conditions while mounted in a standard single 50 cm² fuel cell. The fuel cell was built with the MEAs sandwiched between two carbon fiber gas diffusion layers. The fuel cell was then compressed with fuel cell plates having flow fields with 2 mm wide straight channels separated by 2 mm lands.

The humidity cycle consisted of flowing 2 square-liter per minute (SLPM) supersaturated air streams over both electrodes of the MEA for about 2 minutes, followed by flowing 2 SLPM substantially dry (about 0% RH) air for about 2 minutes at a fuel cell temperature of about 80° C. A crossover leakage was monitored by measuring a flow of air crossing the electrolyte membrane 4 when about 21 kPa of pressure was applied to one side of the fuel cell 2. A failure of the electrolyte membrane 4 was arbitrarily defined by the crossover leakage exceeding a specified threshold of about 10 sccm. To militate against any occurrence of failures induced solely by mechanical stresses, no hydrogen gas was used and no current was drawn from the fuel cell 2 during the in situ test.

As illustrated in FIG. 4, the durability of the second example MEA fabricated with the catalyst ink of the present disclosure was significantly greater than the durability of the second control MEA. It was seen that the second control MEA attained a leak rate of 10 sccm at about 5,000 cycles, whereas the second example MEA did not reach a leak rate of 10 sccm until about 13,000 cycles. Thus, the mechanical durability of the second example MEA over the second control MEA was increased by about 160%.

It is surprisingly discovered that the employment of the reinforcing material 204 at carbon to nanofiber weight ratios of up to about 1:1 does not significantly affect the electrochemical fuel cell reaction that occurs at the electrode 6.

Advantageously, the employment of the reinforcing material 204 at such loadings facilitates the use of the electrodes 6 as a structural component within the fuel cell 2, unlike state of the art electrode layers that are merely used as coatings on structural substrates such as the electrolyte membrane 4 or the gas diffusion layers 10.

It should be further appreciated that the reinforcing material 204 of the present disclosure does not support the catalyst 206, unlike carbon nanotubes disclosed in U.S. Pat. Appn. Pub. No. 2008/008925 to Deng et al. and U.S. Pat. Appn. Pub. No. 2008/115875 to Jeng et al., the entire disclosures of which are hereby incorporated herein by reference. Instead, the reinforcing material 204 and the conductive support particles 202 form a substantially continuous matrix upon a drying of the catalyst ink composition that militates against the formation of the undesirable network of cracks.

While certain representative embodiments and details have been shown for purposes of illustrating the invention, it will be apparent to those skilled in the art that various changes may be made without departing from the scope of the disclosure, which is further described in the following appended claims.

What is claimed is:

1. A catalyst ink composition for a fuel cell electrode-comprising:
   a plurality of electrically conductive support particles;
   a catalyst formed from a finely divided precious metal, the catalyst supported by the conductive support particles;
   an ionomer;
   at least one solvent; and
   a reinforcing material configured to bridge and distribute stresses across the electrically conductive support particles of the ink composition upon a drying thereof, the reinforcing material substantially evenly distributed throughout the catalyst ink composition,
   wherein the reinforcing material is a fiber, the reinforcing material does not support the catalyst, the reinforcing material and the conductive support particles form a substantially continuous matrix upon the drying of the catalyst ink composition that militates against a formation of a network of cracks in the dried catalyst ink composition, a weight ratio of the plurality of electrically conductive support particles to the reinforcing material is about 1:1, and a weight ratio of the ionomer to the plurality of electrically conductive support particles is between about 0.6:1 and about 2:1.

2. The catalyst ink composition of claim 1, wherein the fiber is selected from the group consisting of a carbon nanofiber, a glass fiber, a polymeric fiber, and a metal oxide fiber.

3. The catalyst ink composition of claim 1, wherein the fiber has a diameter larger than a diameter of a carbon nanotube.

4. The catalyst ink composition of claim 1, where the fiber has a length sufficient for the fiber to bridge between at least two of the conductive support particles.

5. The catalyst ink composition of claim 1, wherein the fiber has BET surface area of greater than about 10 meters-squared per gram, a diameter from about 75 nanometers to about 125 nanometers, and a length from about 50 microns to about 100 microns.

6. The catalyst ink composition of claim 1, wherein the fiber is selected from the group consisting of a glass fiber, a polymeric fiber, and a metal oxide fiber.

7. The catalyst ink composition of claim 1, wherein the fiber has a surface modified with an organosilane to increase at least one of a physical entanglement and a chemical adhesion of the reinforcing material with at least one of the conductive support particles and the ionomer.

8. The catalyst ink composition of claim 1, wherein the reinforcing material has a modulus of greater than about 300 Mpa.

9. An electrode for a fuel cell, the electrode comprising:
   an ionomer matrix having a plurality of electrically conductive support particles supporting a catalyst formed from a finely divided precious metal, and a reinforcing material substantially evenly distributed through the ionomer matrix, the reinforcing material bridging across the electrically conductive support particles and configured to and distribute stresses on the electrode,
   wherein the electrode is formed from a dried catalyst ink composition comprising the plurality of electrically conductive support particles supporting the catalyst, at least one solvent, and the reinforcing material, the reinforcing material substantially evenly distributed throughout the catalyst ink composition,
   wherein the reinforcing material is a fiber, the reinforcing material does not support the catalyst, the reinforcing material and the conductive support particles form a substantially continuous matrix that militates against a formation of a network of cracks in the electrode, a weight ratio of the plurality of electrically conductive support particles to the reinforcing material is about 1:1, and a weight ratio of the ionomer matrix to the plurality of electrically conductive support particles is between about 0.6:1 and about 2:1.

10. The electrode of claim 9, wherein the reinforcing material is at least one of physically entangled and chemically bonded with at least one of the conductive support particles and the ionomer.

11. The electrode of claim 10, wherein the fiber has a surface modified to increase at least one of the physical entanglement and the chemical adhesion of the reinforcing material with at least one of the conductive support particles and the ionomer.

12. The electrode of claim 9, wherein the fiber is selected from the group consisting of a carbon nanofiber, a glass fiber, a polymeric fiber, and a metal oxide fiber.

13. The electrode of claim 9, wherein the fiber has a diameter larger than a diameter of a carbon nanotube.

14. The electrode of claim 9, where the fiber has a length sufficient for the fiber to bridge between at least two of the conductive support particles.

15. The electrode of claim 9, wherein the fiber has BET surface area of greater than about 10 meters-squared per gram, a diameter from about 75 nanometers to about 125 nanometers, and a length from about 50 microns to about 100 microns.

16. A catalyst ink composition for a fuel cell electrode, consisting of:
   a plurality of electrically conductive support particles;
   a catalyst formed from a finely divided precious metal, the catalyst supported by the conductive support particles;
   an ionomer;
   at least one solvent; and
   a reinforcing material configured to bridge and distribute stresses across the electrically conductive support particles of the ink composition upon a drying thereof, the reinforcing material substantially evenly distributed throughout the catalyst ink composition,
   wherein the reinforcing material is a fiber, the reinforcing material does not support the catalyst, the reinforcing material and the conductive support particles form a substantially continuous matrix upon the drying of the catalyst ink composition that militates against a formation of a network of cracks in the dried catalyst ink composition, a weight ratio of the plurality of electrically conductive support particles to the reinforcing material is about 1:1, and a weight ratio of the ionomer to the plurality of electrically conductive support particles is between about 0.6:1 and about 2:1.

17. The catalyst ink composition of claim 16, wherein the fiber is selected from the group consisting of a carbon nanofiber, a glass fiber, a polymeric fiber, and a metal oxide fiber.

18. The catalyst ink composition of claim 16, wherein the fiber has a diameter larger than a diameter of a carbon nanotube.

19. The catalyst ink composition of claim 16, where the fiber has a length sufficient for the fiber to bridge between at least two of the conductive support particles.

20. The catalyst ink composition of claim 16, wherein the fiber has BET surface area of greater than about 10 meters-squared per gram, a diameter from about 75 nanometers to about 125 nanometers, and a length from about 50 microns to about 100 microns.

* * * * *